June 9, 1964

L. GRIFFIS 3,136,527

ELECTRIC LANDING GEAR

Filed Sept. 12, 1961

Leroy Griffis
INVENTOR.

June 9, 1964  L. GRIFFIS  3,136,527
ELECTRIC LANDING GEAR
Filed Sept. 12, 1961  2 Sheets-Sheet 2

Leroy Griffis
INVENTOR.

BY Clarence A. O'Brien
and Harvey B. Jacobson
Attorneys

U nited States Patent Office 3,136,527
Patented June 9, 1964

3,136,527
ELECTRIC LANDING GEAR
Leroy Griffis, East Brewton, Ala., assignor of one-half to William R. Stokes, Brewton, Ala.
Filed Sept. 12, 1961, Ser. No. 137,623
6 Claims. (Cl. 254—86)

This invention relates to power operating mechanism, and more particularly to a power operated device for retracting and lowering the dolly wheels or landing gear on a vehicle.

It is the primary object of the invention to provide a power operated device which may replace the conventional manual operating means for lowering and raising the retractable wheels on the forward portion of a trailer for a tractor-trailer truck whereby the wheels may be retracted or lowered as desired merely by pressing a button or other suitable actuating device in the cab of the tractor.

It is another object of the invention to provide an electric powered device for raising and lowering the landing gear of a trailer and which is provided with a base that may be removably secured to an existing trailer and includes a main shaft having universal joints suitably located at opposite ends thereof so that the power device may be mounted in a variety of positions on the trailer, and may be operatively connected to various types of existing landing gears.

It is still another object of the invention to provide an electric lifting device for landing gears which is operable in two directions, and is powered in each direction by a simple electric motor which comprises a conventional vehicle starter.

It is another object of the invention to provide a power device for operating the landing gears of tractor trailers which is powered by electric motors which are connected by suitable conductors, and releasable couplings to control devices in the cab of the tractor.

It is another object of the invention to provide a power operated device for raising and lowering the landing gear of a tractor-trailer which is simple in design, economical to produce and long lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
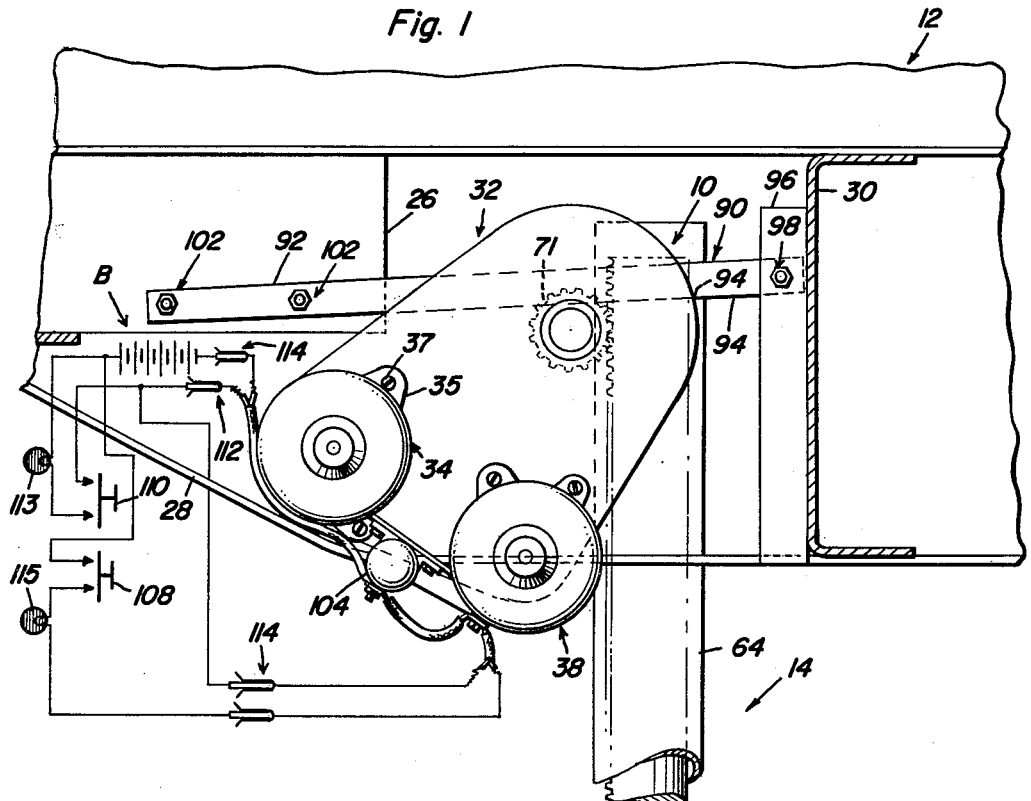
FIGURE 1 is a side elevational view partially in section showing the power device mounted on a tractor trailer and with the landing gear in a lowered position.
Figure 2:
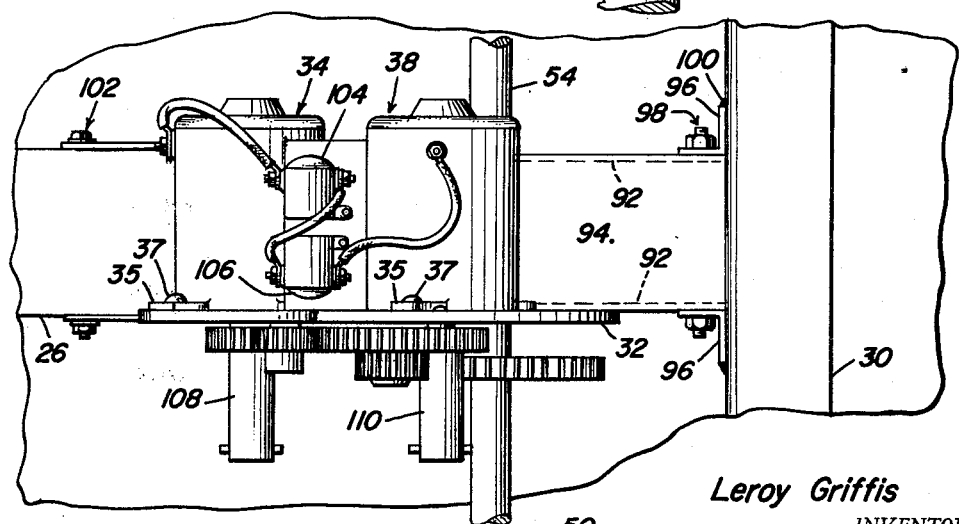
FIGURE 2 is a bottom view of the device shown in FIGURE 1.
Figure 2:

Referring to the drawings, it may be seen that the landing gear operating mechanism 10 is mounted beneath the frame of a trailer 12 of a conventional tractor trailer combination, and is operatively connected to the retractable landing gear or dolly 14 which supports the trailer when it is disconnected from the tractor.

Figure 3:
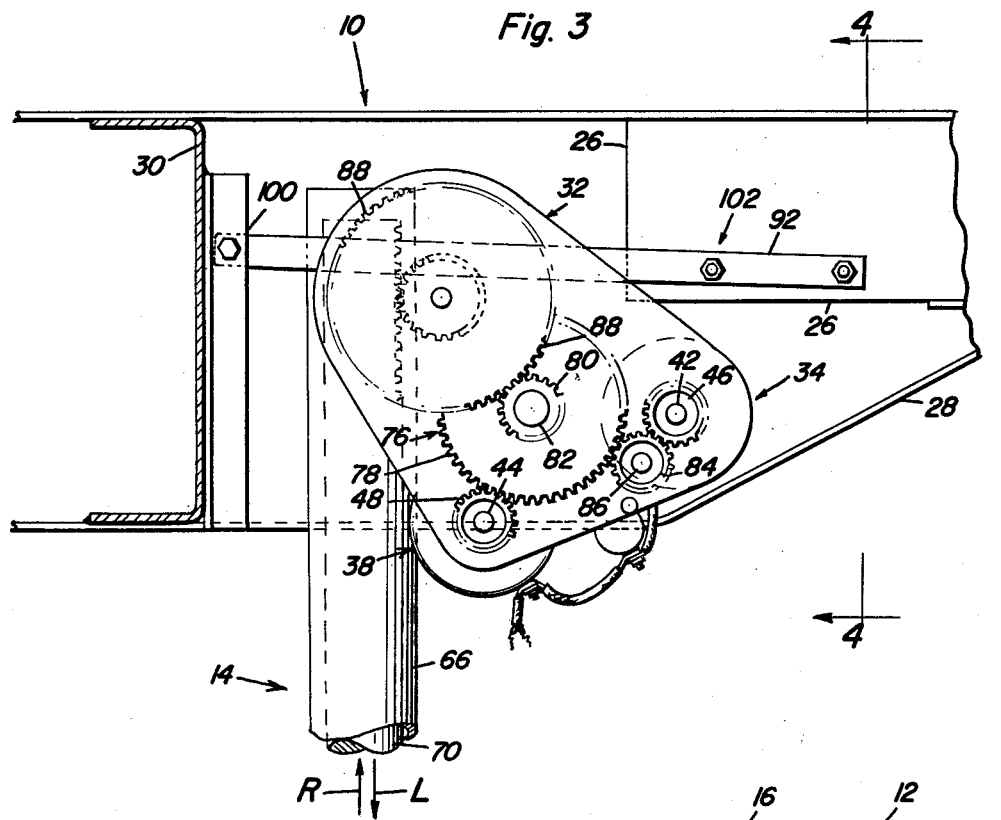
FIGURE 3 is a side elevational view partially in section showing the opposite side of the device shown in FIGURE 1.

The trailer 12 is of conventional construction and comprises a body 16 supported on longitudinally extending side channel members 18 and 20, the channel members 22 and 24 spaced laterally inwardly from the channel members 18 and 20 and also extending parallel thereto, and a central beam 26 of rectangular cross section. The forward portion of each channel member 22 and 24 has its bottom edge tapered forwardly of the trailer in the upward direction as shown at 28 in FIGURE 3. Extending laterally across the forward portion of the trailer 12 between the channel members 18 and 20 is a lateral beam 30. The beam 30 is also U-shaped in cross section as shown in FIGURES 1 and 3.

The operating mechanism 10 comprises a vertically extending base plate 32 preferably composed of a relatively thick heavy gauge metal plate. The plate 32 is of polygonal shape and designed to support and cover a plurality of gears and motors and yet occupy the minimum amount of space.

Mounted on a lower forward corner of the base plate 32 is a motor 34 having a cylindrical housing 36 secured at one end to the plate 32, and mounted on a lower corner of the plate 32 is a motor 38 identical to the motor 34 having a housing 40 secured or fixed to the plate 32. The motor 34 raises the landing gear 14 and moves it in the direction of the arrow R while the motor 38 lowers the landing gear and moves in the direction of the arrow L as viewed in FIGURE 3.

The motors 34 and 38 have rotatable drive shafts 42 and 44 respectively which extend through bores in the base plate 32 and are journalled in bearings mounted in the base plate. The shafts 42 and 44 have driving pinions 46 and 48 respectively secured thereon and the pinions are disposed on the side of the plate 32 remote from the motors 34 and 38.

Figure 4:
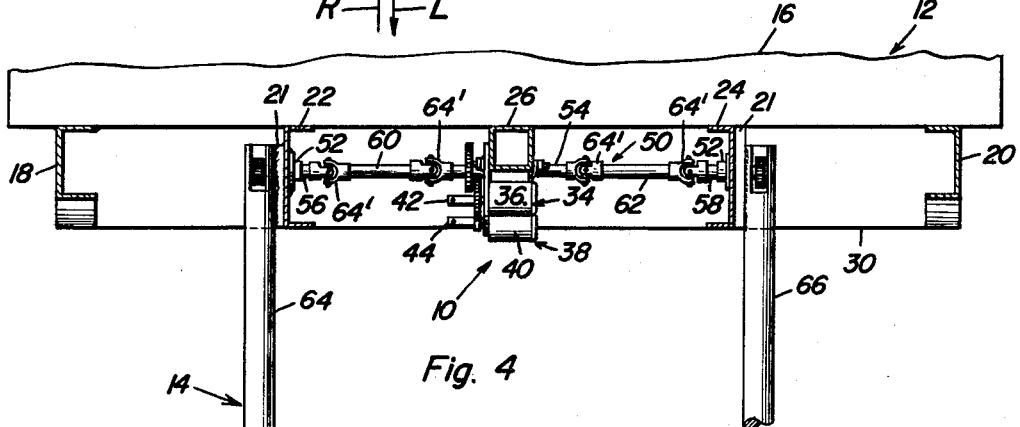
FIGURE 4 is a cross sectional vertical view taken substantially on the plane of line 4—4 in FIGURE 3, and on a reduced scale.

A landing gear operating shaft 50 is rotatably journalled in bearing sleeves 52 which are mounted in the central portions of the channel members 22 and 24 as shown in FIGURE 4. The operating shaft 50 comprises a central gear shaft 54 and two outer bearing shafts 56 and 58 which have their remote ends rotatably journalled in the bearing sleeves 52. The shafts 56 and 58 are drivingly connected to the gear shaft 54 by intermediate shafts 60 and 62 and universal joint assemblies 64'.

The outer ends of the bearing shafts 56 and 58 extend adjacent and to the rear of the upper ends of landing gear sleeve-type struts 64 and 66 secured to the members 22 and 24 by means of plates 21 and welds. The outer ends of shafts 56 and 58 are secured to pinions 71 which have teeth that mate with the teeth of racks 73 formed on the upper ends of the rods 70.

The struts 64 and 66 are hollow tubes and slidably receive strut extension rods 70 which are adjustably locked to the struts by means of setscrews or bolts 72 which are threaded through the lower inner wall of the struts and engage the outer surface of the extension rods as shown in FIGURE 4. The lower ends of the extension rods are fixed to horizontal axles which rotatably mount landing gear wheels 74.

A reduction gear member 76 comprising a large gear 78 and a small pinion 80 is rotatably journalled on the outer side of the plate 32 by means of a shaft 82 which has one end fixed to the plate. The large gear 78 engages the landing gear lowering or driving pinion 48 and a reverting pinion 84 which in turn engages the landing gear raising or driving pinion 46 and is rotatably mounted on the plate 32 by means of a shaft 86.

The central gear shaft 54 is rotatably journaled in a bore in the upper portion of plate 32 which preferably contains a bearing, and the shaft 54 is fixed or drivingly connected to a large operating gear 88. The gear 88 overlaps the gear 78 and drivingly engages the teeth of the small pinion 80.

As shown in FIGURES 1 and 3, the central beam 26 terminates short of the lateral beam 30 as to provide a space between the beams or the upper portion of the landing gear operating mechanism 10. The plate 32 is secured as by welding to the side of a channel support 90 which is U-shaped in cross-section and comprises two vertically extending side legs 92 connected by a bight portion 94. The rear end of the channel member 90 extends between two vertical angle members 96 and is secured thereto by means of a stud and nut assembly 98 extending through aligned apertures in the members. The angle members 96 are in turn secured to the lateral beam 30 by welds 100. The forward end of the bight portion 94 is cut-out and terminates flush with the end of the beam 26 as shown in FIGURE 1 so that the forward ends of the legs 92 may overlap the rear end of the beam 26 as shown in FIGURE 1. The legs 92 are secured to the beam 26 by means of threaded fastening assemblies 102.

The motors 34 and 38 are D.C. electric motors and are preferably Ford starter motors, models 1956 through 1959. Each motor includes a housing having a plurality of radially extending ears 35 which receive threaded fastening members 37 for securing the housings to the plate 32.

The motors 34 and 38 are connected in series with a battery B by means of relays 104 or 106. The relays 104 and 106 are each connected in series with a pushbutton 108 and 110 respectively in the cab of the tractor-trailer. The electrical conductors between the pushbuttons and the relays are divided and connected by electrical jacks 112 and 114 which permit the conductors to be separated when the tractor-trailer combination is separated. Bulbs 113 and 115 are connected in series with buttons 108 and 110.

Normally, when the trailer is connected to and being towed by a tractor, the wheels 74 are elevated slightly above the ground and to prevent damage thereto and for other reasons it is desired to retract the landing gear. This is accomplished by pressing the button 108 in the cab of the tractor-trailer which energizes the motor 34 by means of relay 108. This causes the motor 34 to rotate counter-clockwise as viewed in FIGURE 3 which in turn rotates the gear 44 and landing gear operating shaft 50 in a clockwise direction as viewed in FIGURE 3 so as to move the landing gear in the direction of the arrow R for raising the landing gear. The motor 34 drives the shaft 50 by means of pinions and gears 46, 84, 76, 88. When it is desired to lower the landing gear, the push button 110 is pressed in the cab of the tractor-trailer so as to energize the motor 38 by means of relay 106 for causing the motor and pinion 48 as viewed in FIGURE 3 to rotate in a counter-clockwise direction. Pinion 48 drives the gear 88 and shaft 50 as viewed in FIGURE 3 in a counter-clockwise direction by means of the gear member 76 which causes the landing gear to move in the direction of the arrow L.

The gearing shown in FIGURE 3 acts as a reduction gearing for increasing the mechanical advantage or torque output of the electrical motors. The mechanical advantage of the gearing and the friction thereof also prevents the weight of the trailer from pushing rods 70 into struts 64 and 66.

If desired, conventional fittings, not shown, may be provided on the ends of shaft 50 for connecting it to hand cranks whereby the landing gear may be operated by manual power in emergencies.

The power operated device disclosed in this application is designed to replace the conventional manually operated means for operating the landing gear. Most all landing gears are now lowered by a manual crank. There is a rod running under the trailer from one side of the trailer to the other or from one landing gear to the other. This rod can be easily removed to employ the power device of this invention. This rod is removed and replaced by the landing gear operating shaft 50 and the power device 10. The gear pinions 71 are then secured to the ends of the shaft 50. The universal joints 64' permit the power device 10 to be mounted out of alignment with the shafts 56 and 58. The battery B would normally comprise the truck battery, therefore eliminating any need for a special battery for the motors 34 and 38.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. For use on and in combination with a trailer including an underframe having a longitudinal center beam, a transverse cross beam spaced rearwardly from the rear end of said center beam, and a retractible landing gear on the underframe including a pair of axially spaced, aligned transverse operating shafts, an electric power unit for the landing gear mounted on the underframe between said operating shafts and including a frame structure comprising a longitudinal member extending between the rear end of said center beam and said cross beam, an upstanding plate affixed to one side of said longitudinal member, a transverse power unit shaft disposed between said operating shafts and journaled at an intermediate point through said plate, means operatively connecting the opposite ends of said power unit shaft to the adjacent ends of said operating shafts, a pair of selectively operable electric motors mounted on one side of the plate, and means drivingly connecting said motor to said power unit shaft.

2. For use on and in combination with a trailer including an underframe having a longitudinal center beam, a transverse cross beam spaced rearwardly from the rear of said center beam, and a retractible landing gear on the underframe including a pair of axially spaced, aligned transverse operating shafts, an electric power unit for the landing gear mounted on the underframe between said operating shafts and including a frame structure comprising a longitudinal member extending between the rear end of said center beam and said cross beam an upstanding plate affixed to one side of said longitudinal member, a transverse power unit shaft disposed between said operating shafts and journaled at an intermediate point through said plate, means operatively connecting the opposite ends of said power unit shaft to the adjacent ends of said operating shafts, a pair of selectively operable electric motors mounted on one side of the plate, and means drivingly connecting said motors to said power unit shaft, the last-named means including trains of speed reduction gears on the other side of the plate operatively connecting the motors to the power unit shaft, one of said gear trains comprising a reversing gear.

3. The combination of claim 2, said power unit shaft being substantially aligned with the landing gear shafts, the first-named means including universal joints coupling said shafts.

4. The combination of claim 3, said longitudinal member comprising an inserted channel member including spaced, parallel forwardly projecting legs on its forward end receiving the rear end portion of the center beam therebetween and affixed thereto.

5. The combination of claim 4, said frame structure further comprising a pair of vertical angle members on the cross beam receiving the rear end portion of the channel member therebetween and affixed thereto.

6. The combination of claim 5, together with means electrically connected to the motors for energizing same and controlling said motors independently from a remote point.

References Cited in the file of this patent
UNITED STATES PATENTS

| 2,082,033 | Seyferth et al. | June 1, 1937 |
| 2,523,962 | Mahaffey et al. | Sept. 26, 1950 |

FOREIGN PATENTS

| 739,554 | France | Nov. 3, 1932 |